United States Patent [19]

Mathers et al.

[11] 3,941,714
[45] Mar. 2, 1976

[54] PROCESS FOR RECLAIMING RARE EARTH OXYSULFIDE PHOSPHORS

[75] Inventors: James E. Mathers; Ramon L. Yale; H. David Layman, all of Ulster, Pa.

[73] Assignee: GTE Sylvania Incorporated, Stamford, Conn.

[22] Filed: Dec. 23, 1974

[21] Appl. No.: 535,493

[52] U.S. Cl............................ 252/301.4 S; 423/21
[51] Int. Cl.$^2$........................................ C09K 11/46
[58] Field of Search 252/301.4 R, 301.4 S, 301.6 S; 423/21, 109

[56] References Cited
UNITED STATES PATENTS

| | | | |
|---|---|---|---|
| 3,348,924 | 10/1967 | Levine et al. | 252/301.4 R X |
| 3,418,246 | 12/1968 | Royce | 252/301.4 S |
| 3,502,590 | 3/1970 | Royce et al. | 252/301.4 S |
| 3,763,050 | 10/1973 | Dikhaff | 252/301.4 S X |
| 3,864,273 | 2/1975 | Forbes et al. | 252/301.4 S X |

*Primary Examiner*—Jack Cooper
*Attorney, Agent, or Firm*—Norman J. O'Malley
Donald R. Castle; John C. Fox

[57] ABSTRACT

A process suitable for reclaiming europium-activated yttrium oxysulfide contaminated with europium-activated yttrium oxide and other non-rare earth cathodoluminescent phosphors comprises forming a relatively uniform admixture of specific fluxing agents, the contaminated yttrium oxysulfide phosphor, a sufficient amount of reactive rare earth source selected from reactive yttrium and europium sources to achieve a predetermined yttrium to europium ratio in the admixture and an excess of the theoretical amount of sulfur required to convert the yttrium oxide and the yttrium source to yttrium oxysulfide, heating the admixture at a temperature of at least 850°C in non-oxidizing atmosphere for a time sufficient to convert the yttrium oxide and the yttrium source to a europium-activated yttrium oxysulfide whereby the rare earth materials form a cathodoluminescent material and whereby the non-rare earth materials form water soluble reaction products, washing the resulting material with sufficient water to remove water soluble materials leaving a cathodoluminescent europium-activated yttrium oxysulfide phosphor.

4 Claims, No Drawings

PROCESS FOR RECLAIMING RARE EARTH OXYSULFIDE PHOSPHORS

BACKGROUND OF THE INVENTION

1. Field of the Invention

This invention relates to reclaiming europium-activated yttrium oxysulfide phosphors contaminated with other cathodoluminescent phosphor materials. More particularly it relates to a process for removing the contaminants and additionally enables the particle size, emission color, body color and the chemical composition of the resulting phosphor to be controlled in such a manner as to yield a highly satisfactory cathodoluminescent europium-activated yttrium oxysulfide phosphor.

2. Prior Art

Europium-activated yttrium oxysulfide phosphor is one of the most used red emitting phosphors in color picture tubes. Another red emitting phosphor used in sizeable quantities is europium-activated yttrium oxide. However, in many instances due to poor quality tubes, tube breakage and the like, these phosphors become contaminated with other phosphors. Since these rare earth phosphors are expensive recovery or reclamation is necessary for economic reasons. Generally the red emitting phosphor has also been contaminated with the blue and green emitting phosphors which are generally the zinc sulfide or zinc-cadmium sulfide. Heretofore, the contaminated red rare earth phosphors have been reclaimed by treating with mineral acid washes, caustic washes and with or without oxidizing agents such as hydrogen peroxide and sodium hypochlorite. Such treatment is adequate for many types of reclaims, however when a europium-activated yttrium oxysulfide phosphor has an appreciable amount of yttrium oxide along with the other cathodoluminescent phosphors; the methods used to remove the blue and green contaminants dissolve some of the yttrium oxide europium-activated red phosphor. Since the rare earth materials are very expensive, this adds appreciably to the cost of the phosphors. Additionally, even if the yttrium oxide is not lost, the chromaticity of the reclaimed phosphor may be shifted because the europium that is present in the europium-activated yttrium oxysulfide. It is believed that a method which enables the treatment of a contaminated europium-activated yttrium oxysulfide phosphor wherein the contaminants include europium-activity yttrium oxide along with the other cathodoluminescent materials used in color picture tube manufacture in which the europium-activated, yttrium oxide material is converted to a satisfactory europium-activated yttrium oxysulfide having a desired or predetermined yttrium to europium ratio would be an advancement in the art.

OBJECTS AND SUMMARY OF THE INVENTION

It is an object of this invention to provide an improved process for reclaiming europium-activated yttrium oxysulfide.

It is an additional object of this invention to provide a method whereby a europium-activated yttrium oxysulfide phosphor contaminated with europium-activated yttrium oxide can be efficiently and economically processed to an acceptable red emitting cathodoluminescent phosphor without an appreciable loss of the rare earth values.

It is still another object of this invention to provide a process for reclaiming a contaminated europium-activated yttrium oxysulfide phosphor wherein the particle size and distribution is controlled, the emission spectra is controlled, the body color is improved and the chemical composition is purified.

These and other objects of the invention are achieved in one embodiment of this invention by providing a process wherein a relatively uniform admixture of a cathodoluminescent europium-activated yttrium oxysulfide phosphur contaminated with europium-activated yttrium oxide and other non-rare earth cathodoluminescent phosphor materials is formed in conjunction with a flux selected from a group consisting of alkali metal phosphates and alkali metal carbonates, a sufficient amount of a reactive rare earth source selected from reactive yttrium and europium sources to achieve a predetermined yttrium to europium molar ratio in the admixture and an excess of the theoretical amount of sulfur required to convert the yttrium oxide and the yttrium source to yttrium oxysulfide, heating the foregoing admixture at a temperature of at least 850°C in a non-oxidizing atmosphere for a time sufficient to convert the yttrium oxide and the yttrium source to a europium-activated yttrium oxysulfide having the predetermined yttrium to europium molar ratio whereby the rare earth materials form the foregoing cathodoluminescent material and the non-rare earth materials form a water soluble reaction product and thereafter washing the resulting material with sufficient water to remove the water soluble material and drying the resulting europium-activated cathodoluminescent yttrium oxysulfide phosphor.

DESCRIPTION OF THE PREFERRED EMBODIMENT

For a better understanding of the present invention, together with other and further objects, advantages, and capabilities thereof, reference is made to the following disclosure and appended claims in connection with the above description of some of the aspects of the invention.

The contaminated material is generally analyzed by routine chemical analysis to determine the amount of yttrium oxide, europium, and other contaminants present. From this analysis it can be determined whether or not the desired yttrium to europium ratio is present in the material. The amount of addition of either the reactive yttrium source or europium source to achieve the desired yttrium to europium ratio can be determined prior to forming the admixture. About 0.5 to about 5.0 percent by weight based upon the contaminated material of a suitable flux selected from the group consisting of the alkali metal phosphates and alkali metal carbonates is added to the contaminated material and the desired amount of the reactive rare earth source. From about 5 percent to about 10 percent excess of the amount of sulfur that is theoretically required to convert the yttrium oxide and the amount of the reactive yttrium source is added. The alkali metal phosphates and alkali metal carbonates are of the preferred fluxing materials since they form either water soluble or volatile reaction products with the materials with which they react. For example, an alkali metal carbonate when reacted with yttrium oxide and sulfur along with yttrium phosphate as the reactive yttrium source to form $Y_2O_2S$ sodium phosphate which is water soluble and carbon dioxide is evolved. Sulfur that is in excess either forms water soluble polysulfides or is vaporized. The desired yttrium and europium sources are generally the oxides or the oxalates, carbonates, phosphates, and the like, since these materials react to form either water soluble or volatile reaction products.

After the admixture is formed it is heated at a temperature of at least about 850°C in a non-oxidizing atmosphere for sufficient time for the yttrium oxide and the reactive yttrium source to be sulfurized to form yttrium oxysulfide. The preferred temperature for firing the admixture is from about 950°C to about 1100°C and the time required to convert the material at about 1000°C is about 1.5 hours. Longer times are required if lower temperatures are used. After firing, the fired material is washed with hot water to remove the water soluble materials. The completeness of the removal can easily be determined by measuring the pH of the wash water after it has washed the fired material. When the pH becomes neutral the water soluble materials have been removed. The phosphor is then filtered, dried, and generally has the desired particle size and particle size distribution and the proper chromaticity. Generally the brightness of the claimed phosphor is as bright as virgin europium-activated yttrium oxysulfide. To more fully illustrate the subject invention the following detailed examples are presented. All parts, proportions, and percentages are by weight unless otherwise indicated.

EXAMPLE 1

About 23 parts of an europium-activated yttrium oxysulfide phosphor contaminated with about 5 percent of yttrium oxide and about 1 percent of green and blue emitting sulfide phosphors is mixed with about 0.56 parts of sulfur, about 0.636 parts of sodium carbonate, and about 0.142 parts of yttrium phosphate in order to achieve the proper europium to yttrium ratio as determined by the chemical analysis of the contaminated phosphor. After the admixture is formed, and blended to achieve a relatively uniform admixture, it is placed in a non-oxidizing atmosphere and heated for 1 hour at about 1100°C. After cooling the material to atmospheric temperature it is washed in hot water until a neutral pH of the wash water is achieved. Thereafter the solids are removed by filtration, dried, and sieved through a 400 mesh screen. An analysis of a sample of the resulting phosphors shows that it is 99.9% europium-activated yttrium oxysulfide and is essentially free of original contaminants which included rare earth oxides and the green and blue emitting sulfide phosphors. The brightness of the phosphor is compared to a standard europium-activated yttrium oxysulfide is about 98 percent of the standard under cathode ray excitation.

In some instances when the recontaminated material contains large amounts of contaminants the foregoing process can be preceded by various treatments to remove some of the organic contaminants and major portions of the sulfides. The contaminated phosphor is treated with weak caustic and weak acid washes. By "weak" caustic it is meant no greater than 5percent by weight of sodium hydroxide and by "weak" acid is meant with an acid containing less than 2 percent by weight of nitric acid. By this method no appreciable amount of the rare earth phosphor is lost.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process suitable for reclaiming cathodoluminescent europium-activated yttrium oxysulfide phosphor, contaminated with europium-activated yttrium oxide, and non-rare earth cathodoluminescent green and blue emitting sulfide phosphor materials said process comprising:
    a. forming a relative uniform admixture of said contaminated oxysulfide phosphor, from about 0.5 to about 5.0 percent by weight of said admixture of a flux selected from the group consisting of alkali metal phosphates and alkali metal carbonates, a sufficient amount of a reactive rare earth source selected from reactive yttrium and europium sources to achieve a predetermined Y:Eu molar ratio in the europium activated yttrium oxysulfide formed upon subsequent heating and an excess of the theoretical amount of sulfur required to convert said yttrium oxide and said yttrium source to yttrium oxysulfide; said reactive yttrium and europium sources forming europium activated yttrium oxysulfide and water soluble or volatile reaction products upon said subsequent heating
    b. heating said admixture at a temperature of at least 850°C in non-oxidizing atmosphere for a time sufficient to convert said europium activated yttrium oxide and said yttrium and europium sources to a europium-activated yttrium oxysulfide cathodoluminescent material having said predetermined Y:Eu ratio whereby the non-rare earth sulfide phosphor materials form water soluble reaction products.
    c. washing the heated admixture with sufficient water to remove water soluble reaction products, and
    d. drying the resulting europium-activated $Y_2O_2S$.

2. A process according to claim 1 wherein said excess of said sulfur is from about 5 to about 15 molar percent.

3. A process according to claim 2 wherein said temperature is from about 950°C to about 1100°C.

4. A process according to claim 3 wherein said flux is sodium carbonate.

* * * * *